US008352863B2

(12) United States Patent
Eilers

(10) Patent No.: US 8,352,863 B2
(45) Date of Patent: Jan. 8, 2013

(54) ELECTRONIC PRODUCT DESIGN USING LAYERED IMAGES

(75) Inventor: Laban D. Eilers, Framingham, MA (US)

(73) Assignee: Vistaprint Technologies Limited, Hamilton (BM)

( * ) Notice: Subject to any disclaimer, the term of this patent is extended or adjusted under 35 U.S.C. 154(b) by 478 days.

(21) Appl. No.: 11/648,990

(22) Filed: Jan. 3, 2007

(65) Prior Publication Data

US 2008/0163069 A1 Jul. 3, 2008

(51) Int. Cl.
*G06F 3/00* (2006.01)
*G06F 3/048* (2006.01)

(52) U.S. Cl. .......................................... 715/731; 715/780

(58) Field of Classification Search .................. 715/243, 715/731, 744, 780; 705/26; 709/223
See application file for complete search history.

(56) References Cited

U.S. PATENT DOCUMENTS

| 5,748,963 | A | 5/1998 | Orr .............................. 395/704 |
| 5,822,587 | A | 10/1998 | McDonald et al. ............. 395/702 |
| 5,838,906 | A | 11/1998 | Doyle et al. ............. 395/200.32 |
| 5,895,476 | A | 4/1999 | Orr et al. ...................... 707/517 |
| 5,895,477 | A | 4/1999 | Orr et al. ...................... 707/517 |
| 5,903,902 | A | 5/1999 | Orr et al. ...................... 707/517 |
| 5,930,810 | A | 7/1999 | Farros et al. .................. 707/506 |
| 5,956,737 | A | 9/1999 | King et al. .................... 707/517 |
| 6,161,114 | A | 12/2000 | King et al. .................... 707/517 |
| 6,247,011 | B1 | 6/2001 | Jecha et al. |
| 6,631,375 | B2 | 10/2003 | Jecha et al. |
| 6,976,798 | B2 * | 12/2005 | Keane et al. .................... 400/76 |
| 6,993,209 | B1 * | 1/2006 | Schowtka et al. ............. 382/298 |
| 7,207,001 | B2 * | 4/2007 | Bailey et al. .................. 715/234 |
| 7,216,092 | B1 * | 5/2007 | Weber et al. .................... 705/26 |
| 2004/0243930 | A1 * | 12/2004 | Schowtka et al. ............. 715/513 |
| 2004/0268231 | A1 * | 12/2004 | Tunning ........................ 715/513 |
| 2005/0050052 | A1 * | 3/2005 | Zimmerman et al. ........ 707/100 |
| 2005/0262437 | A1 * | 11/2005 | Patterson et al. ............. 715/517 |
| 2005/0289474 | A1 * | 12/2005 | Master et al. .................. 715/765 |

FOREIGN PATENT DOCUMENTS

EP 1040428 B1 11/2004

OTHER PUBLICATIONS

Potu, Madhuri. Paperful to Paperless Office Forms Integration Framework. Masters thesis submitted to San Jose State University Dept. of Computer Science Published May 2004. [retrieved on May 22, 2008]. Retrieved from the Internet : <URL: http://www/cs/sjsu.edu/faculty/pollett/masters/Semesters/Fall03/MadhuriPotu/CS298Report.pdf>.

(Continued)

*Primary Examiner* — Rashawn Tillery
(74) *Attorney, Agent, or Firm* — Jessica Costa

(57) ABSTRACT

A system and method for online product design. An electronic product template having a number of pre-defined text fields and template editing tools for allowing the user to incorporate user text into the text fields are downloaded to a user computer. The current state of the product design is retained at the user computer. When the user has entered text for incorporation into a text field, the text for that text field and the associated font information are uploaded to the server. The server creates an image of the text field and downloads the text image to the user computer for incorporation into the displayed product design according to text positioning information retained at the user computer. Each text field in the design is a separate image that can be individually and independently edited and positioned within the product design.

25 Claims, 8 Drawing Sheets

OTHER PUBLICATIONS

Nov. 14, 2007 VistaPrint's Responses to Defendants' First Set of Requests for Admissions to Plaintiff—Nos. 1-18, USDC D. Minn. C.A. No. 07-cv-2298-JNE-JJK *VistaPrint Technologies Limited* v. *123Print, Inc., et al.*

Jun. 30, 2008 VistaPrint's Responses to Defendants' Second Set of Requests for Admissions to Plaintiff—Nos. 19-55, USDC D. Minn. C.A. No. 07-cv-2298-JNE-JJK *VistaPrint Technologies Limited* v. *123Print, Inc., et al.*

CONF-AEO Deposition transcript of Steven T. Jecha dated Jan. 10, 2008, USDC D. Minn. C.A. No. 07-cv-2298-JNE-JJK *VistaPrint Technologies Limited* v. *123Print, Inc., et al.*

Exhibit 4: Website printout, Seybold Publications, "What has WYSIWYG done to us?" VP0007355-7372 [to Deposition transcript of Steven T. Jecha dated Jan. 10, 2008, USDC D. Minn. C.A. No. 07-cv-2298-JNE-JJK *VistaPrint Technologies Limited* v. *123Print, Inc., et al.*].

Exhibit 5: A White Paper Prepared by CAP Ventures, SJ000001-0028 [to Deposition transcript of Steven T. Jecha dated Jan. 10, 2008, USDC D. Minn. C.A. No. 07-cv-2298-JNE-JJK *VistaPrint Technologies Limited* v. *123Print, Inc., et al.*].

Exhibit 6: Article, "Who's the Boss" Oct. 1998, SJ000048-0055 [to Deposition transcript of Steven T. Jecha dated Jan. 10, 2008, USDC D. Minn. C.A. No. 07-cv-2298-JNE-JJK *VistaPrint Technologies Limited* v. *123Print, Inc., et al.*].

Exhibit 7: Article, "ONLINE for success" Feb. 1999, SJ000030 to 0033 [to Deposition transcript of Steven T. Jecha dated Jan. 10, 2008, USDC D. Minn. C.A. No. 07-cv-2298-JNE-JJK *VistaPrint Technologies Limited* v. *123Print, Inc., et al.*].

Exhibit 8: Article reprint, "iPrint Discount Printing Shop Awarded Twice During Internet Grand Opening," Jan. 17, 1997, ABC0011639-1640 [to Deposition transcript of Steven T. Jecha dated Jan. 10, 2008, USDC D. Minn. C.A. No. 07-cv-2298-JNE-JJK *VistaPrint Technologies Limited* v. *123Print, Inc., et al.*].

Exhibit 9: Article reprint, "Self-Service Stationery," May 20, 1997, ABC0011706-1708 [to Deposition transcript of Steven T. Jecha dated Jan. 10, 2008, USDC D. Minn. C.A. No. 07-cv2298-JNE-JJK *VistaPrint Technologies Limited* v. *123Print, Inc., et al.*].

Exhibit 11: Article reprint, "It Takes a Cyber-Village, Tech Companies Find a Haven in St. Paul's Lowertown," Nov. 24, 1997, ABC0017589-7593 [to Deposition transcript of Steven T. Jecha dated Jan. 10, 2008, USDC D. Minn. C.A. No. 07-cv-2298-JNE-JJK *VistaPrint Technologies Limited* v. *123Print, Inc., et al.*].

Exhibit 12: Article reprint, "St. Paul, Minn 119 Software Firm Aims for Error-Free Internet Printing Jobs." Jan. 3, 1998, ABC0017594-7595 [to Deposition transcript of Steven T. Jecha dated Jan. 10, 2008, USDC D. Minn. C.A. No. 07-cv-2298-JNE-JJK *VistaPrint Technologies Limited* v. *123Print, Inc., et al.*].

Exhibit 13: Article reprint, iPrint Raises 1st Round Funding to Innovate $20 Billion Commercial Printing Market; Online Print Shop Environment to Revolutionize Commercial Printing, Nov. 10, 1997, ABC0011674 [to Deposition transcript of Steven T. Jecha dated Jan. 10, 2008, USDC D. Minn. C.A. No. 07-cv-2298-JNE-JJK *VistaPrint Technologies Limited* v. *123Print, Inc., et al.*].

Exhibit 14: Article reprint, "Deluxe Launches World's Easiest Business Cards Limited Edition New FREE Software Download Lets Computer Users Try Before They Buy," Nov. 14, 1996, ABC0011594 to 1595 [to Deposition transcript of Steven T. Jecha dated Jan. 10, 2008, USDC D. Minn. C.A. No. 07-cv-2298-JNE-JJK *VistaPrint Technologies Limited* v. *123Print, Inc., et al.*].

Exhibit 15: Article, "Proposing a Standard Web API," Feb. 1996, ABC0011748 to 1754 [to Deposition transcript of Steven T. Jecha dated Jan. 10, 2008, USDC D. Minn. C.A. No. 07-cv2298-JNE-JJK *VistaPrint Technologies Limited* v. *123 Print, Inc., et al.*].

Exhibit 16: Website printout, iPrint.com, Sep. 15, 2000, ABC0011976 to 1984 [to Deposition transcript of Steven T. Jecha dated Jan. 10, 2008, USDC D. Minn. C.A. No. 07-cv2298-JNE-JJK *VistaPrint Technologies Limited* v. *123Print, Inc., et al.*].

Exhibit 17: Website printout, Insty-Prints BizCards Online, Sep. 14, 2000, ABC0011985 to 1990 [to Deposition transcript of Steven T. Jecha dated Jan. 10, 2008, Usdc D. Minn. C.A. No. 07- cv-2298-JNE-JJK *VistaPrint Technologies Limited* v. *123Print, Inc., et al.*].

Exhibit 18: Website printout, Insty-Prints, Sep. 14, 2000, ABC0011991 to 1999 [to Deposition transcript of Steven T. Jecha dated Jan. 10, 2008, USDC D. Minn. C.A. No. 07-cv-2298-JNE-JJK *VistaPrint Technologies Limited* v. *123Print, Inc., et al.*].

Exhibit 20: Steve Jecha/Winfield Mitchell Privileged Document Log, 1 pg. [to Deposition transcript of Steven T. Jecha dated Jan. 10, 2008, USDC D. Minn. C.A. No. 07-cv-2298-JNE-JJK *VistaPrint Technologies Limited* v. *123Print, Inc., et al.*].

Exhibit 21: Steve Jecha Privileged Document Log, 1 pg. [to Deposition transcript of Steven T. Jecha dated Jan. 10, 2008, USDC D. Minn. C.A. No. 07-cv-2298-JNE-JJK *VistaPrint Technologies Limited* v. *123Print, Inc., et al.*].

Exhibit 33: Article, "Essential Gear for Prepress Success '98," May 1998, SJ000044 to 0045 [to Deposition transcript of Steven T. Jecha dated Jan. 10, 2008, USDC D. Minn. C.A. No. 07-cv2298-JNE-JJK *VistaPrint Technologies Limited* v. *123Print, Inc., et al.*].

Exhibit 34: Website printout, Minnesota Secretary of State, Digital-Net, Inc., VP0013393 [to Deposition transcript of Steven T. Jecha dated Jan. 10, 2008, USDC D. Minn. C.A. No. 07-cv2298-JNE-JJK *VistaPrint Technologies Limited* v. *123Print, Inc., et al.*].

Exhibit 35: Group exhibit, JM000001 to 0116 [to Deposition transcript of Steven T. Jecha dated Jan. 10, 2008, USDC D. Minn. C.A. No. 07-cv-2298-JNE-JJK *VistaPrint Technologies Limited* v. *123Print, Inc., et al.*].

Exhibit 36: Group exhibit, folder labeled "Completed Biz-Cards," SJ000809 to 0833 [to Deposition transcript of Steven T. Jecha dated Jan. 10, 2008, USDC D. Minn. C.A. No. 07-cv-2298-JNE-JJK *VistaPrint Technologies Limited* v. *123 Print, Inc., et al.*].

Exhibit 37: Group exhibit, folder labeled "BANC—General Info," SJ000834 to 0920 [to Deposition transcript of Steven T. Jecha dated Jan. 10, 2008, USDC D. Minn. C.A. No. 07-cv2298-JNE-JJK *VistaPrint Technologies Limited* v. *123Print, Inc., et al.*].

Exhibit 38: Group exhibit, folder labeled "Bizcards Online," SJ000921 to 1003 [to Deposition transcript of Steven T. Jecha dated Jan. 10, 2008, USDC D. Minn. C.A. No. 07-cv-2298-JNE-JJK *VistaPrint Technologies Limited* v. *123Print, Inc., et al.*].

Exhibit 39: e-mail string, Jecha to Arledge, Dec. 18, 1997, w/ attachment, SJ000589, 0599 to 0600, 0603 to 0604, 0601 to 0602 [to Deposition transcript of Steven T. Jecha dated Jan. 10, 2008, USDC D. Minn. C.A. No. 07-cv-2298-JNE-JJK *VistaPrint Technologies Limited* v. *123Print, Inc., et al.*].

Exhibit 49: Publication, "The Future of Digital Printing is Powered by Virtual Pre-Press," SJ000162 to 0178 [to Deposition transcript of Steven T. Jecha dated Jan. 10, 2008, USDC D. Minn. C.A. No. 07-cv-2298-JNE-JJK *VistaPrint Technologies Limited* v. *123Print, Inc., et al.*].

Exhibit 50: Group exhibit, "VPP in-a-Box Prospect Letters," SJ000243 to 0259 [to Deposition transcript of Steven T. Jecha dated Jan. 10, 2008, USDC D. Minn. C.A. No. 07-cv-2298-JNE-JJK *VistaPrint Technologies Limited* v. *123Print, Inc., et al.*].

Exhibit 51: Business Plan, Digital-Net, Inc., SJ000185 to 0214 [to Deposition transcript of Steven T. Jecha dated Jan. 10, 2008, USDC D. Minn. C.A. No. 07-cv-2298-JNE-JJK *VistaPrint Technologies Limited* v. *123Print, Inc., et al.*].

Exhibit 55: File Wrapper and Contents, European Patent Office File Wrapper, ABC0012610 to 13431 [to Deposition transcript of Steven T. Jecha dated Jan. 10, 2008, USDC D. Minn. C.A. No. 07-cv-2298-JNE-JJK *VistaPrint Technologies Limited* v. *123Print, Inc., et al.*].

CONF-AEO Deposition transcript of Winfield A. Mitchell dated Jan. 11, 2008, USDC D. Minn. C.A. No. 07-cv-2298-JNE-JJK *VistaPrint Technologies Limited* v. *123Print, Inc., et al.*

Exhibit 58: European Patent Specification, EP 1 040 428 B1, ABC0012577 to 2609 [to Deposition transcript of Winfield A. Mitchell dated Jan. 11, 2008, USDC D. Minn. C.A. No. 07-cv-2298-JNE-JJK *VistaPrint Technologies Limited* v. *123Print, Inc., et al.*].

Exhibit 59: Article "Print Merge" Red Herring, Spring, 1997, 5 pgs. [to Deposition transcript of Winfield A. Mitchell dated Jan. 11, 2008, USDC D. Minn. C.A. No. 07-cv-2298-JNE-JJK *VistaPrint Technologies Limited* v. *123Print, Inc., et al.*].

Exhibit 75: Subpoena in a Civil Case, Dan Gribsby, with attachments, 8 pgs. [to Deposition transcript of Daniel C. Grigsby dated Mar. 11, 2008, USDC D. Minn. C.A. No. 07-cv-2298-JNE-JJK *VistaPrint Technologies Limited* v. *123Print, Inc., et al.*].

Deposition transcript of Neil Mix dated Apr. 24, 2008, USDC D. Minn. C.A. No. 07-cv-2298-JNE-JJK *VistaPrint Technologies Limited* v. *123Print, Inc., et al.*

Exhibit 102: Defendants' Notice of Taking Deposition of Neil Mix [to Deposition transcript of Neil Mix dated Apr. 24, 2008, USDC D. Minn. C.A. No. 07-cv-2298-JNE-JJK *VistaPrint Technologies Limited* v. *123Print, Inc., et al.*].

Feb. 4, 2008 DI59 Defendants' Memorandum in Support of Their Motion to Amend Their Answer to Allege Inequitable Conduct and Unclean Hands, USDC D. Minn. C.A. No. 07-cv-2298-JNE-JJK *VistaPrint Technologies Limited* v. *123Print, Inc., et al.*

Mar. 12, 2008 DI70 First Amended Answer and Counterclaims of 123Print, Inc.; Drawing Board (US), Inc. (d/b/a Stationery House, Inc.); and Taylor Strategic Accounts, Inc. to Plaintiffs Second Amended Complaint, USDC D. Minn. C.A. No. 07-cv-2298-JNE-JJK *VistaPrint Technologies Limited* v. *123Print, Inc., et al.*

Jun. 30, 2008 Defendants' Answers to Plaintiff's Third Set of Interrogatories (Nos. 10-17), USDC D. Minn. C.A. No. 07-cv-2298-JNE-JJK *VistaPrint Technologies Limited* v. *123Print, Inc., et al.*

Defendants' Amended Prior Art Statement dated Jun. 16, 2008, USDC D. Minn. C.A. No. 07-cv-2298-JNE-JJK *VistaPrint Technologies Limited* v. *123Print, Inc., et al.*

Preliminary Invalidity Claim Chart for U.S. Pat. No. 6,247,011—Amaya Editor/Browser dated Jun. 16, 2008.

Welcome to Amaya. W3C, 2007 [retrieved 2007] Amaya Editor/Browser Retrieved from the Internet: <URL: www.w3.org> ABC0016203 to ABC0016424.

Preliminary Invalidity Claim Chart for U.S. Pat. No. 6,247,011—BizCards dated Jun. 16, 2008.

CONF-About Digital-Net, Inc., undated VP0000163 to 165.

Insty-Prints BizCards Online [online]. [Retrieved on Sep. 14, 2000]. Retrieved from the internet: <URL: https://www.banc.com/instyprints/>. [Bates Nos. ABC0011985-11999.

Preliminary Invalidity Claim Chart for U.S. Pat. No. 6,247,011 & One or More of the Design Intelligence, Inc. Patents (ABC0017059-17490) dated Jun. 16, 2008.

Preliminary Invalidity Claim Chart for U.S. Pat. No. 6,247,011 & Doyle Feb. 1996 Article Entitled "Proposing a Standard Web API" (ABC11748-754) dated Jun. 13, 2008.

Doyle, M., Ang, C. and Martin, D. *Proposing a Standard Web API*, Dr. Dobb's Journal (Feb. 1996) pp. 18-26 ABC11748-11754.

Preliminary Invalidity Claim Chart for U.S. Pat. No. 6,247,011 & Doyle's U.S. Patent 5,838,906 (ABC 11320-339) dated Jun. 13, 2008.

Preliminary Invalidity Claim Chart for U.S. Pat. No. 6,247,011 U.S. Patent 5,930,810 issued to Farros et al. (Farros '810 Patent) (ABC0011474-494) dated Jun. 13, 2008.

Preliminary Invalidity Claim Chart for U.S. Pat. No. 6,247,011—iPRINT dated Jun. 13, 2008.

'iPrint Discount Printing Shop Awarded Twice During Internet Grand Opening' dated Jan. 17, 1997, pp. 11-12, PR Newswire Association, Inc. ABC0011639-11640.

'Talk City Welcomes eCommerce to its Internet Community; Launches New Online Shopping Area with FAO Schwarz, Amazon.com, CyberShop, eToys, iPrint, First Auction, ISN's Computer Superstore, Worldview Systems and Talk City's own Company Store' dated Dec. 9, 1997, pp. 4-6, PR Newswire Association, Inc. ABC0011666-11668.

'commerceNet Names iPrint Electronic Commerce Winner; VIP (very Innovative Practice) Award Given to Online Print Shop,' dated Nov. 12, 1997, p. 9, PR Newswire Association, Inc. ABC0011671.

'iPrint Announces Presonalized Holiday Cards; Now You Can Design and Order Professionally Printed Holiday Cards Directly Online', dated Oct. 27, 1997, pp. 13-14, PR Newswire Association, Inc. ABC0011675-11676.

'Prodigy Partners with iPrint; Internet Discount Stationery Leader iPrint to Provide Online Design and Printing Services for Prodigy Members' dated Sep. 30, 1997, pp. 15-16, PR Newswire Association, Inc. ABC0011677-11678.

'Internet Discount Stationery Leader iPrint to Offer Online Design and Printing Services via Apple Small Business Website,' dated Sep. 17, 1997, pp. 17-18, PR Newswire Association, Inc. ABC0011679-11680.

'EarthLink Network to Offer Electronic Shopping With Top Retail Brands,' dated Sep. 9, 1997, pp. 19-20, PR Newswire Association, Inc. ABC0011681-11682.

'iPrint Qualifies for Excite Certified Merchant Program Internet Discount Stationery Leader iPrint Participates in Launch,' dated Sep. 4, 1997, pp. 21-22, PR Newswire Association, Inc. ABC0011683-11684.

'CSi CompuServe Partners with iPrint; Internet Discount Stationery Leader iPrint to Provide Online Design and Printing Services for CSi Members', dated Sep. 3, 2997, pp. 23-24, PR Newswire Association, Inc. ABC0011685-11686.

'TENERON.com and iPrint, Inc. Announce Strategic Partnership Agreement' dated Aug. 15, 1997, pp. 25-26, PR Newswire Association, Inc. ABC0011687-11688.

'iPrint Honored for Business Excellence on the Web by IDG's WebMaster Magazine' dated Aug. 15, 1997, pp. 27-28, PR Newswire Association, Inc. ABC0011689-11690.

Post-Newsweek Business Information, Inc. Newsbytes. Online Printing Company Introduces Cyberstationary. Moffett Field, California, USA, Jul. 30, 1997 [online] [retrieved on Jul. 9, 1997]. ABC0011691-11692.

PR Newswire Association, Inc. Financial News. Internet Stationery Leader iPrint Helps San Francisco Bay Area Business Cope With the Costs of Area Code Changes; iPrint Discount Print Shop Provides Online Design and Printing Services. NASA Ames Research Center, Moffett Field, Calif. Jul. 30, 1997 [online] [retrieved on Jul. 31, 1997] ABC0011693.

'iPrint Introduces CyberStationery; iBizCards, iAnnounce, & iInvites Are First Online Versions of Printed Stationery', dated Jul. 29, 1997, pp. 32-33, PR Newswire Association, Inc. ABC0011694-11695.

'Fee Me', dated Jul. 17, 1997, p. 34, PR Newswire Association, Inc. ABC0011696.

'iPrint, Internet Shopping Network Partner; iPrint to Provide Online Design and Printing for ISN,' dated Jul. 15, 1997, pp. 35-36, PR Newswire Association, Inc. ABC0011697-11698.

'iPrint Partners with ONVILLAGE; iPrint to Provide Online Design and Printing for ONVILLAGE Yellow Pages Customers,' dated Jul. 1, 1997, p. 37, PR Newswire Association, Inc. ABC0011699.

'iPrint Offers Online Discount Printing via FourII; iPrint Extends Popular Online Design and Printing Service to fourII.com,' dated Jun. 23, 1997, p. 38, PR Newswire Association, Inc. ABC0011700.

'iPrint joins PointCast Connections Superchannel; iPrint Develops Premier Printing Channel on the Internet,' dated Jun. 17, 1997, pp. 39-40, PR Newswire Association, Inc. ABC0011701-11702.

'iPrint and onQ Announce Partnership; Internet Discount Stationery Leader iPrint to Provide Online Design and Printing for onQ Gay Forum Members,' dated Jun. 16, 1997, p. 41, PR Newswire Association, Inc. ABC0011703.

'InfoSpace Partners With iPrint; Internet Discount Stationery Leader iPrint to Provide Online Design and Printing for InfoSpace Customers,' dated Jun. 16, 1997, p. 42, PR Newswire Association, Inc. ABC0011704.

'iPrint Adds Labels, New Graphics to Internet Print Shop,' dated Jun. 12, 1997, p. 43, PR Newswire Association, Inc. ABC0011705.

'Self-Service Stationery,' dated May 20, 1997, pp. 44-46, PR Newswire Association, Inc. ABC0011706-11708.

'Internet Stationery Leader iPrint, Inc. Announces Rubber Stamps and Server Clustering,' dated May 13, 1997, p. 47, PR Newswire Association, Inc. ABC0011709.

'Taking Printing to the 'Net; Offers printing services over the Internet,' dated May 1997, pp. 48-49, PR Newswire Association, Inc. ABC0011710-11711.

'Internet Stationery Leader iPring Helps Seattle Business Cope With the Costs of Area Code Changes; iPrint Discount Print Shop Provides Online Design and Printing Services at up to 70% Off of Traditional Commercial Print Costs,' dated Apr. 30, 1997, p. 50, PR Newswire Association, Inc. ABC0011712.

'Internet Stationery Leader iPrint Partners with FourII's RocketMail; iPrint Internet Discount Print Shop to Provide Online Design and Printing Services for RocketMail Customers in a Co-label Agreement,' dated Apr. 24, 1997, pp. 51-52, PR Newswire Association, Inc. ABC0011713-11714.

'iPrint Lets You Design Your Own Money on the Internet and Save Big $'s,' dated Apr. 1, 1997, p. 53, PR Newswire Association, Inc. ABC0011715.

'Internet Business Card Leader iPrint, Inc. Announces Letterhead and Envelopes Extensions; Now You can Design and Order Discount Envelopes, Letterhead, Even Import Your Company's Logo,' dated Mar. 7, 1997, pp. 54-55, PR Newswire Association, Inc. ABC0011716-11717.

'Shop Lets Customers Be Designers, via Browser,' dated Feb. 17, 1997, pp. 56-57, PR Newswire Association, Inc. ABC0077718-11719.

'iPrint, the Internet discount printing shop of the future provides commercial thermography using the BCT system,' dated Jan. 31, 1997, pp. 58-59, PR Newswire Association, Inc. ABC0011720-11721.

'BCT announces a strategic agreement with iPrint, the Internet discount printing shop,' dated Jan. 30, 1997, p. 60, PR Newswire Association, Inc. ABC0011722.

'iPrint Discount Printing Shop Awarded Twice During Internet Grand Opening,' dated Jan. 17, 1997, pp. 61-62, PR Newswire Association, Inc. ABC0011723-11724.

'Printer Utilities: Page Formatting Programs,' dated May 11, 1987, pp. 63-67, PR Newswire Association, Inc. ABC0011725-11729.

'Indigo Software Ltd. Has unveiled 1print, a forms and graphics generation program for laser printers. Lprint is said to allow the use of an IBM Personal Computer to draw forms and graphics interactively on the screen using a mouse or a cursor and function keys and to save the results as an electronic form1 1print supports printers from Hewlett-Packard Col, Canon, Inc., IBM and NCR Corp. It costs $259. Indigo Software, 1568 Carling Ave., Ottawa, Ont., Canada K1Z 7M5,' dated Mar. 3, 1986, p. 68, NEW PRODUCTS; Microcomputers; Software utilities; p. 78 Computerworld, Inc. ABC0011730.

'SPA Names iPrint a Finalist for Prestigious SPA Codie Award; iPrint Professional Print Shop Sets New Standard for Interactive E-Commerce,' dated Dec. 16, 1997, p. 1, PR Newswire Association, Inc. ABC0011731.

'iPrint Announces Personalized Holiday Cards; Now You can Design and Order Professionally Printed Holiday Cards Directly Online,' dated Oct. 27, 1997, pp. 2-3, PR Newswire Association, Inc. ABC0011732-11733.

'Internet Stationery Leader iPrint Helps San Francisco Bay Area Business Cope With the Costs of Area Code Changes; iPrint Discount Print Shop Provides Online Design and Printing Services,' dated Jul. 30, 1997, p. 4, PR Newswire Association, Inc. ABC0011734.

'iPrint Introduces CyberStationery; iBizCards, iAnnounce, & iInvites Are First Online Versions of Printed Stationery,' dated Jul. 29, 1997, pp. 5-6, PR Newswire Association, Inc. ABC0011735-11736.

'Fee Me,' dated Jul. 17, 1997, p. 7, PR Newswire Association, Inc. ABC0011737.

'iPrint Offers Online Discount Printing via FourII; iPrint Extends Popular Online Design and Printing Service to FourII.com,' dated Jun. 23, 1997, p. 8, PR Newswire Association, Inc. ABC0011738.

'iPrint joins PointCast Connections Superchannel; iPrint Develops Premier Printing Channel on the Internet,' dated Jun. 17, 1997, pp. 9-10, PR Newswire Association, Inc. ABC0011739-11740.

'iPrint and onQ Announce Partnership; Internet Discount Stationery Leader iPrint to Provide Online Design and Printing for onQ Gay Forum Members,' dated Jun. 16, 1997, p. 11, PR Newswire Association, Inc. ABC0011741.

'Internet Stationery Leader iPrint Helps Seattle Business Cope With the Costs of Area Code Changes; iPrint Discount Print Shop Provides Online Design and Printing Services at up to 70% Off of Traditional Commercial Print Costs,' dated Apr. 30, 1997, p. 12, PR Newswire Association, Inc. ABC0011742.

'iPrint Lets You Design Your Own Money on the Internet and Save Big $'s,' dated Apr. 1, 1997, p. 13, PR Newswire Association, Inc. ABC0011743.

'Internet Business Card Leader iPrint, Inc. Announces Letterhead and Envelopes Extensions; Now You Can Design and Order Discount Envelopes, Letterhead, Even Import Your Company's Logo,' dated Mar. 7, 1997, pp. 14-15, PR Newswire Association, Inc. ABC0011744-11745.

'iPrint Discount Printing Shop Awarded Twice During Internet Grand Opening,' dated Jan. 17, 1997, pp. 16-17, PR Newswire Association, Inc. ABC0011746-11747.

File History for U.S. Patent 6,247,011 ABC0011755-11768.

Burke, Jonathan. 'Print Merge iPrint wants to become the front end for the entire business forms printing market'. *The Red Herring*, 1997 [online]. Retreived from http://www.redherring.com/hits/03/merge.html. ABC0011971-11984.

Edwards, S., Kingsley, L., Votsch, V., Walter, M. 'Roll over, Gutenberg: how the Web is changing printing,' Seybold Report on Internet Publishing, v2, n1, p. 5(16) Sep. 1997 VP0006144-6162.

CONF USPTO U.S. Appl. No. 08/982,438, Amendment and Examiner Interview Summary, dated Sep. 19, 2000 VP0010767-10785.

Preliminary Invalidity Claim Chart for U.S. Pat. No. 6,247,011—Java in a Nutshell dated Jun. 13, 2008 'Java in a Nutshell' is a book published before the priority date of the patents-in-suit. "Java in a Nutshell: A Desktop Quick Reference for Java Programmers" by David Flanagan (O'Reilly & Associates, Inc., 1996).

Preliminary Invalidity Claim Chart for U.S. Pat. No. 6,247,011—PRINTOVATION™ dated Jun. 13, 2008.

'Printovation, Vision/Scope Document' dated Feb. 23, 1998 ABC0002175-2180.

'Printovation, Functional Requirements' dated Feb. 23, 1998 ABC0002181-2205.

'Printovation—Internet Bound Vision/Scope Document' dated Nov. 12, 1997 ABC0002223-2227.

Printovation Business Profile dated Feb. 1997 ABC0007434-7478.

Preliminary Invalidity Claim Chart for U.S. Pat. No. 6,247,011—WebEdit dated Jun. 13, 2008.

CD containing native file Nesbitt Software WebEdit ABC0016903.

Email from <Newshirt@best.com> to nesbitt.com dated Mar. 3, 1996 ABC0016184-16186.

Website <www.nesbitt.com> dated Feb. 17, 1997 ABC0017563-17580.

Preliminary Invalidity Claim Chart for U.S. Pat. No. 6,247,011 & Webwriter (ABC0016045-16077) dated Jun. 13, 2008.

Agenda May 7-9, 1996, Fifth International World Wide Web Conference May 6-10, 1996, Paris, France ABC0016045-16056.

Crespo, A. and Bier, E.A., 'WebWriter: A Browser-Based Editor for Constructing Web Applications,' Fifth International World Wide Web Conference May 6-10, 1996, Paris, France ABC0016057-16077.

Preliminary Invalidity Claim Chart for U.S. Pat. No. 6,247,011—World's Easiest dated Jun. 13, 2008.

'World's Easiest' information sheet ABC0001753.

'Print Now or Print Professionally' Technology Profile dated Feb. 1997 ABC0001757-1799.

Krishna, B.C. '1996, Gutenberg, and the Revenge of Movable Type' dated Oct. 18, 2007 <www.w3.org>ABC11576-11584.

'World's Easiest; Deluxe's World's Easiest Business Essentials DTP software; Software Review; Brief Article; Evaluation' dated May 1997, pp. 3-4, Copyright 1997 Information Access Company, a Thompson Corporation Company; ASAP Copyright 1997 Ziff-Davis Publishing Company PC/Computing ABC0011585-11586.

'Marketing Mix: The castaway client' dated Feb. 6, 1997, p. 5, Copyright 1997 Haymarket Publishing Services Ltd. Marketing ABC0011587.

'Risky business; Deluxe Corp's World's Easiest Business Essentials business printing software; Software Review; Brief Article; Evaluation' dated Feb., 1997, p. 6, Copyright 1997 Information Access Company, a Thompson Corporation Company; ASAP Copyright 1997 Ziff-Davis Publishing Company Windows Sources ABC0011588.

'Risky business; Deluxe Corp's World's Easiest Business Essentials business printing software; Software Review; Brief Article Evaluation' dated Feb. 1997, p. 7, Copyright 1997 Information Access Company, a Thompson Corporation Company; ASAP Copyright 1997 Ziff-Davis Publishing Company Windows Sources ABC0011589.

'World's Easiest Software for OS/2 Warp Ships Today As Part of Deluxe Corporation and IBM Joint Marketing Agreement' dated Dec. 6, 1996, pp. 8-9, Copyright 1996 PR Newswire Association, Inc. PR Newswire ABC0011590-11591.

'World's Easiest Offers Free Holiday Ink Stamp Software on the Internet; Custom Address Stamps Add a Festive Touch to Holiday Greetings' dated Nov. 27, 1996, pp. 10-11, Copyright 1996 PR Newswire Association, Inc. PR Newswire ABC0011592-11593.
'Deluxe Launches World's Easiest Business Cards Limited Edition New FREE Software Download Lets Computer Users Try Before They Buy,' dated Nov. 14, 1996, pp. 12-13, Copyright 1996 PR Newswire Association, Inc. PR Newswire ABC0011594-11595.
'Deluxe Launches Improved World's Easiest On-Line Printing Service; New Software and Services Provide the Easiest Way Yet to 'Print Now or Print Professionally" dated Sep. 25, 1996, pp. 14-15 Copyright 1996 PR Newswire Association, Inc. PR Newswire ABC0011596-11597.
'Deluxe Software Licensed' dated Jun. 13, 1996, p. 16 Copyright 1996 Saint Paul Pioneer Press All Rights Reserved Saint Paul Pioneer Press (Minnesota) ABC0011598.
'Deluxe Corporation Enters Licensing Agreement With IBM IBM Licenses World's Easiest Software for the Aptiva Personal Computer' dated Jun. 12, 1996, pp. 17-18 Copyright 1996 PR Newswire Association, Inc. PR Newswire ABC0011599-11600.
'Deluxe Corporation and IBM Announce World's Easiest Software for OS/2 Warp Environment' dated Apr. 17, 1996, p. 19, Copyright 1996 PR Newswire Association, Inc. PR Newswire ABC0011601.
'World's Easiest Announcements lives up to its name; T/Maker's World's Easiest Announcements announcement design software; Software Review; Evaluation; Brief Article' dated Apr. 1996, pp. 20-21, Copyright 1996 Information Access Company, a Thompson Corporation Company; ASAP Copyright 1996 Ziff Davis Publishing Company Computer Shopper ABC0011602-11603.
'High Tech Holiday Gifts' dated Dec. 2, 1995, pp. 22-23, Copyright 1995 Cable News Network, Inc. ABC0011604-11605.
'For the World's Easiest Personal Image Bundle, a cliché rings true; T/Maker Co; Software Review; Brief Article; Evaluation' dated Dec. 1995, pp. 24-25, Copyright 1995 Information Access Company, a Thompson Corporation Company; ASAP Copyright 1995 Ziff Davis Publishing Company Computer Shopper ABC0011606-11607.
'Business Image Bundle; T/Maker Co's World's Easiest Business Image Bundle Beginning business graphics software; Windows 95 Buyers Guide; Software Review; Brief Article; Evaluation' dated Dec. 1995, pp. 26-27, Copyright 1995 Information Access Company, a Thompson Corporation Company; ASAP Copyright 1995 Ziff Davis Publishing Company PC/Computing ABC0011608-609.
'Runners Rack Up Mileage' dated Sep. 15, 1995, pp. 28-29, Copyright 1995 The Roanoke Times (Virginia) ABC0011610-11611.
'T/Maker Introduces World's Easiest Software Line; Deluxe subsidiary's software makes creating customized products as easy to use as a push-button appliance' dated Aug. 28, 1995, pp. 30-31, Copyright 1995 PR Newswire Association, Inc. ABC0011612-11613.
'Apple Delivers Next Generation of Portable Performance With New PowerPC Processor-Based Macintosh Powerbook 5300; PowerBook 5300 Models Lead Industry in Price/Performance' dated Aug. 28, 1995 Copyright 1995 PR Newswire Association, Inc. ABC0011614-11617.
'T/Maker Introduces World's Easiest Software Line; a Brand New Line of Software that Makes Creating Customized Products as Easy as Using a Push-Button Appliance' dated Aug. 25, 1995, pp. 36-37 Copyright 1995 Business Wire, Inc. ABC0011618-11619.
'World's Easiest Software Offers Simple Graphics Design' dated Aug. 24, 1995, pp. 38-39 Copyright 1995 Post-Newsweek Business Information Inc. Newsbytes ABC0011620-11621.
'T/Maker Introduces World's Easiest Software Line; A Brand New Line of Software That Makes Creating Customized Products As Easy to Use As a Push-Button Appliance' dated Aug. 18, 1995, pp. 40-42 Copyright 1995 PR Newswire Association, Inc. ABC0011622-11624.
'Activesystems Announces World's Easiest-to-Use Document Storage and Retrieval Product for Client/Server Environments' dated Mar. 24, 1994, pp. 43-44 Copyright 1994 Canada NewsWire Ltd. ABC011625-11626.
'Activesystems Announces World's Easiest-to-Use Document Storage and Retrieval Product for Client/Server Environments' dated Mar. 24, 1994, pp. 45-46 Copyright 1994 PR Newswire Association, Inc. ABC0011627-11628.
Preliminary Invalidity Claim Chart for U.S. Pat. No. 6,247,011—Applix Anywhere dated Jun. 13, 2008.
Sommergut, W., 'Competing Approaches, Office Solutions for the Slim Client' dated Nov. 1997, Heft 5, ABC0037761-37773.

Bericht, CW, Sommergut, W., 'Widerstreitende Ansätze Office-Lösungen für den schlanken Client' dated Nov. 1997, Heft 5, VP0015588-15598.
'Applix announces Applix Anywhere Office, the most complete Java-based desktop environment for the Sun JavaStation' dated Oct. 29, 1996 <www.thefreelibrary.com> ABC0037982-37987.
'Applix demos one of the first enterprise-aware Sun Microsystems Java web application; World Wide Web becomes transport for new kind of client/server deployment—simplified access to enterprise data for decision support any time, anywhere in the world' dated Nov. 8, 1995 <www.thefreelibrary.com> ABC0037988-37993.
'Anyware Demo' dated 1997 <www.applix.com> ABC0037994-38017.
'Applix helps you to stay ahead of your changing world' dated 1997 <www.applix.com> ABC0038018-38019.
'Applix Anyware' dated 1998 <www.applix.com> ABC0038020-38023.
Applix WebWord demo. Retrieved from Internet: <http://web.archive.org/web/19980429184900/www.applix.com/anyware/demo/webword.gif> ABC0038024-38025.
'Commission File No. 0-25040 Applix, Inc.' U.S. Securities and Exchange Commission Form 10-K/A dated Dec. 31, 2000 ABC0038057-38076.
'Commission File No. 0-25040 Applix, Inc.' U.S. Securities and Exchange Commission Amendment No. 1 to Form 10 K/A dated Dec. 31, 2000 ABC0038077-38161.
'Applix sells off Vistasource, Applixware Office, Anywhere Office, and Cosource' dated May 15, 2001 <www.linuxtoday.com> ABC0038162-38178.
Preliminary Invalidity Claim Chart for U.S. Pat. No. 6,247,011—Corel Office for Java dated Jun. 13, 2008.
Both, D. 'OS/2 WARP' <www.os2bbs.com> Millennium Technology ABC0037827-37838.
'IBM OS/2 Warp 4 screen shots' <toastytechcom> undated ABC0037839-37858.
'OS/2', Wikipedia, undated <en.wikipedia.org> ABC0037859-37879.
'Corel Office—Java Version Beta 1' dated Apr. 16, 1998 <www.somis.dundee.ac.uk> ABC0037880-37898.
'Corel Office fuer OS/2 Warp 4' dated Sep. 25, 1996 <groups.google.com/group/maus.os.os2.talk ABC0037899.
'Corel Office for Java Certified 100% Pure Java' dated May 1, 1997, 2008 Novell, Inc., ABC0037900-37901.
'SOMIS—University of Dundee—Downloadable Goods' Apr. 16, 1998 <www.somis.dundee.ac.uk/pub/downs/goods.htm> ABC0037902-37905.
'Welcome of Corel Office for Java' dated Nov. 19, 1996 <officeforjava.corel.com> ABC0037906-37930.
'WordPerfect for IBM Personal Computers' Version 5.0 WordPerfect Corporation 1989, ABC0037931-37934.
'WordPerfect Suite 8 User's Guide' Corel Corporation Limited, 1997, ABC0037935-37981.
CD containing Corel Office for Java Version 1.0, © Corel Corporation Limited, 1997 ABC0038310.
Preliminary Invalidity Claim Chart for U.S. Pat. No. 6,247,011—SCITEX dated Jun. 13, 2008.
Seybold Special Report 'SSF '95, Part I, Electronic Delivery, High-Res Output, Short-Run Printing' © 1995 Business Wire, © 1994 Gale Group VP0015949-15952.
European Patent Office, Decision revoking the European Patent EP 1040428B1, Jun. 25, 2009, Germany, pp. 49.
Pages from the Corel Office for Java website retrieved from archive.org and accompanying affidavit, dated Nov. 19, 1996 and Jan. 13, 1997 and archived Dec. 19, 1996 and Feb. 10, 1997.
Sommergut, Wolfgang, *Office Solutions for the Slim Client*, Mar. 1997, Germany, along with original foreign language version.
Brors, Dieter, *Internet-Office: Office Packages Increasingly Application Servers*, May 1997, Germany, along with original foreign language version.
Michel, Dieter, *Applix Anywhere and Corel Office for Java: Thick and Thin*, Jul. 1997, Germany, along with original foreign language version.
Seybold Special Report, *Electricity Delivery, High-Res Output, Short-Run Printing*, Sep. 26, 1995 and Oct. 23, 1995, San Francisco, CA.

* cited by examiner

ELECTRONIC PRODUCT DESIGN USING LAYERED IMAGES

FIELD OF THE INVENTION

The invention relates to the electronic creation of customized products.

BACKGROUND OF THE INVENTION

Many individuals, businesses, and organizations occasionally have a need to purchase a quantity of custom printed materials, such as business cards, product or service brochures, promotional postcards, personalized holiday cards, birth announcements, party invitations, or any number of other items. Many of these individuals and businesses obtain these products through the web sites of online printing service providers, such as VistaPrint.com operated by VistaPrint Limited.

Online printing service providers, taking advantage of the capabilities of the Web and modern Web browsers, provide document design services for users desiring to create customized documents from any computer with web access at whatever time and place is convenient to the user. These service providers typically provide their customers with the ability to access the service provider's web site, view examples of the types of products offered by the provider, and view images of a variety of pre-designed product templates prepared by the site operator. To give the user a wide range of design suggestions, templates presenting a variety of different styles, formats, backgrounds, color schemes, fonts and designs from which the user may choose are typically presented.

When a user has selected a specific template design to customize, the site typically provides product design tools allowing the user to provide personal information for incorporation into the selected template and, in many cases, to perform other modifications to the template design to create a customized electronic document design. After the user has finished designing the product, the site typically allows the user to place an order for the production and delivery of a desired quantity of printed products to the user's home or business.

Various web-based processes and techniques for allowing a user to customize a product design have been employed. In some prior art applications, all product design inputs from the user, such as the text characters the user desires to appear in the product and the user's selections from menus of color options and font options, are forwarded to the printing service provider server for processing. The server creates the image depicting the product design and downloads it to the user's computer for user review. If the user desires to modify any element of the design, the user must again indicate the desired changes, submit the information to the server and wait for the revised version of the document to be received and displayed. The current state of the product design is retained at the server and, therefore, this product creation approach requires repetitive interaction with, and product image transferring from, the server.

Other printing services providers have opted for downloading a set of software tools to the user's computer that are adapted to execute in the user's browser and provide the user with the ability to perform many WYSIWYG product editing operations in the browser at the client system, such as entering text, changing fonts or font attributes, and resizing, repositioning template elements with little or no interaction with the server in the browser at the client system. Some providers have chosen to implement this type of browser-based design tools using markup language code while others have implemented the tools using Flash authoring software from Adobe Systems Incorporated. With either approach, a significant amount of software code is typically required to implement the wide range of editing functions and the time required to complete the downloading process of the tool set may be considered by some users to be undesirably lengthy.

Downloading a font to a user computer for use by the user's browser tends to significantly increase the delay perceived by the user. Font files tend to be relatively large and, even over a relatively fast network connection, may require a few seconds to download. This delay, even if brief, may lead to user irritation or disappointment. If a user desires to display text in multiple different fonts in the user's product design, the time required to download the multiple different font files will increase accordingly. Users who are impatient or who are interacting with the site over a slow communication channel may opt to abandon the site rather than wait for the full set of tools to complete the download. The loss of these users before they can be engaged in the product design process represents both potential customer dissatisfaction and a potential loss of the revenue to the printing service provider.

In addition, for printing services providers desiring to present a WYSIWYG product design experience to their customers, the lack of a standard browser mechanism for rendering downloaded fonts potentially creates problems in producing a WYSIWYG printed product that faithfully represents the online design viewed and approved by the user. Browser programs from different vendors and even different browser versions from the same vendor may render downloaded fonts in a slightly different manner.

There is, therefore, a need for a system and method of online document design that provides flexible and responsive WYSIWYG editing capabilities while reducing the time required to make the editing tools available to the user at the user's computer.

SUMMARY

The present invention is directed at satisfying the need for a flexible and responsive editing system that can be made quickly available to online users.

In accordance with one aspect of the invention, product templates are comprised of a plurality of individual component images, including all product text fields. Each component image is rendered at the server, downloaded to the user computer, and combined with other component images into a template image at the user computer according to component image positioning information maintained at the client computer. A revised image of a text field is generated each time a user edits the text content of the field or changes the size of the field.

It is an advantage of the invention that WYSIWYG user text editing is facilitated without font file downloads to the user's computer.

These and other objects, features and advantages of the invention will be better understood with reference to the accompanying drawings, description and claims.

DETAILED DESCRIPTION

Figure 1:
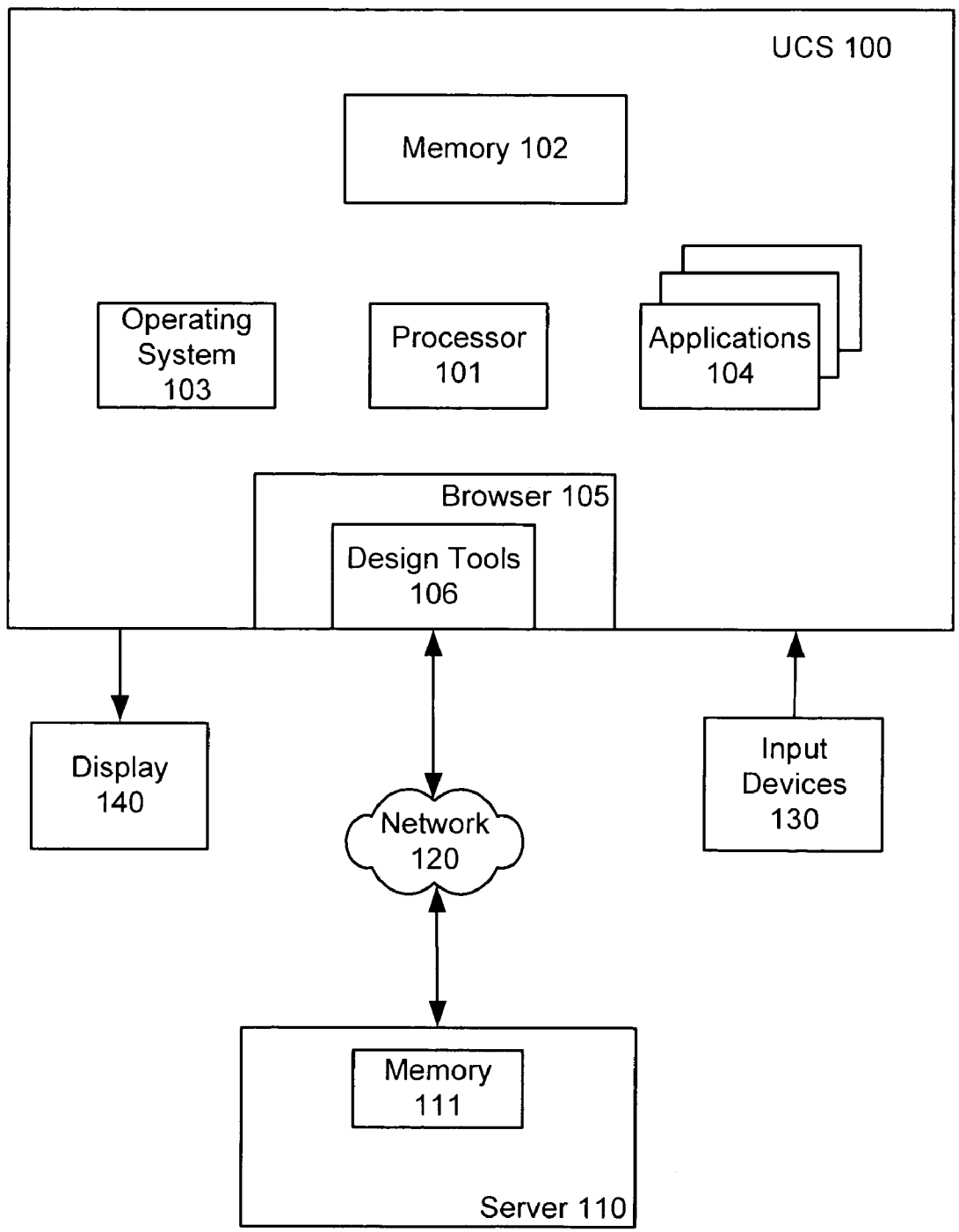
FIG. 1 shows a representative system with which the invention may be employed.

FIG. 1 depicts a representative system with which the invention may be employed. User computer system UCS 100 includes processor 101 and memory 102. Memory 102 represents all UCS 100 components and subsystems that provide data storage, such as RAM, ROM, and hard drives. In addition to providing permanent storage for all programs installed on UCS 100, memory 102 also provides temporary storage required by the operating system and the applications while they are executing. In a preferred embodiment, UCS 100 is a typically equipped personal computer, but UCS 100 could also be a portable computer, a tablet computer, or other device. The user views images from UCS 100 on display 140, such as a CRT or LCD screen, and provides inputs to UCS 100 via input devices 130, such as a keyboard and a mouse.

When UCS 100 is operating, an instance of the USC 100 operating system, for example a version of the Microsoft Windows operating system, will be running, represented in FIG. 1 by operating system 103. In addition, the user may be running one or more application programs Applications 104. In FIG. 1, UCS 100 is running Web browser 105, such as Internet Explorer from Microsoft Corporation. In the depicted embodiment, design tools 106 is a set of markup language product design tools downloaded to UCS 100 via network 120 from remote server 110. Design tools 106 runs in browser 105 and exchanges information and instructions with server 110 during a design session to support the user's preparation of a customized product design in electronic form. When the customer is satisfied with the design of the product, the design information can be uploaded to server 110 for storage and, if desired by the user, subsequent production of the desired quantity of the physical product on appropriate printing and post-print processing systems.

Server 110 provides data storage and processing support for the web site operations of the printing services provider or other entity offering the online product creation service. While server 110 is shown in FIG. 1 as a single block, it will be understood that server 110 could be multiple servers configured to communicate and operate cooperatively to support web site operations. Server 110 will typically be interacting with many user computer systems, such as UCS 100, simultaneously. Memory 111 represents all components and subsystems that provide server data storage, such as RAM, ROM, and disk drives or arrays. Memory 111 includes the various layouts, designs, colors, fonts, images, and other information provided by the service provider to enable the creation and rendering of product templates.

In interacting with server 110, a user will typically arrive at the site home page and then navigate through one or more product promotion pages, not shown, displaying examples of the types of products offered by the provider and allowing the user to select a particular product type. Within a product type, the user can review one or more pages displaying thumbnail images of various product design templates available from the printing services provider for the selected product type. The site would typically offer a wide range of different templates with different combinations of layouts, color schemes, font schemes, component images, and so forth. After the user has selected the specific design that the user wants to serve as the basis for the user's creation of a personalized design, an initial product customization screen, including the selected electronic editable template, is downloaded from server 110 to USC 100.

Figure 2A:
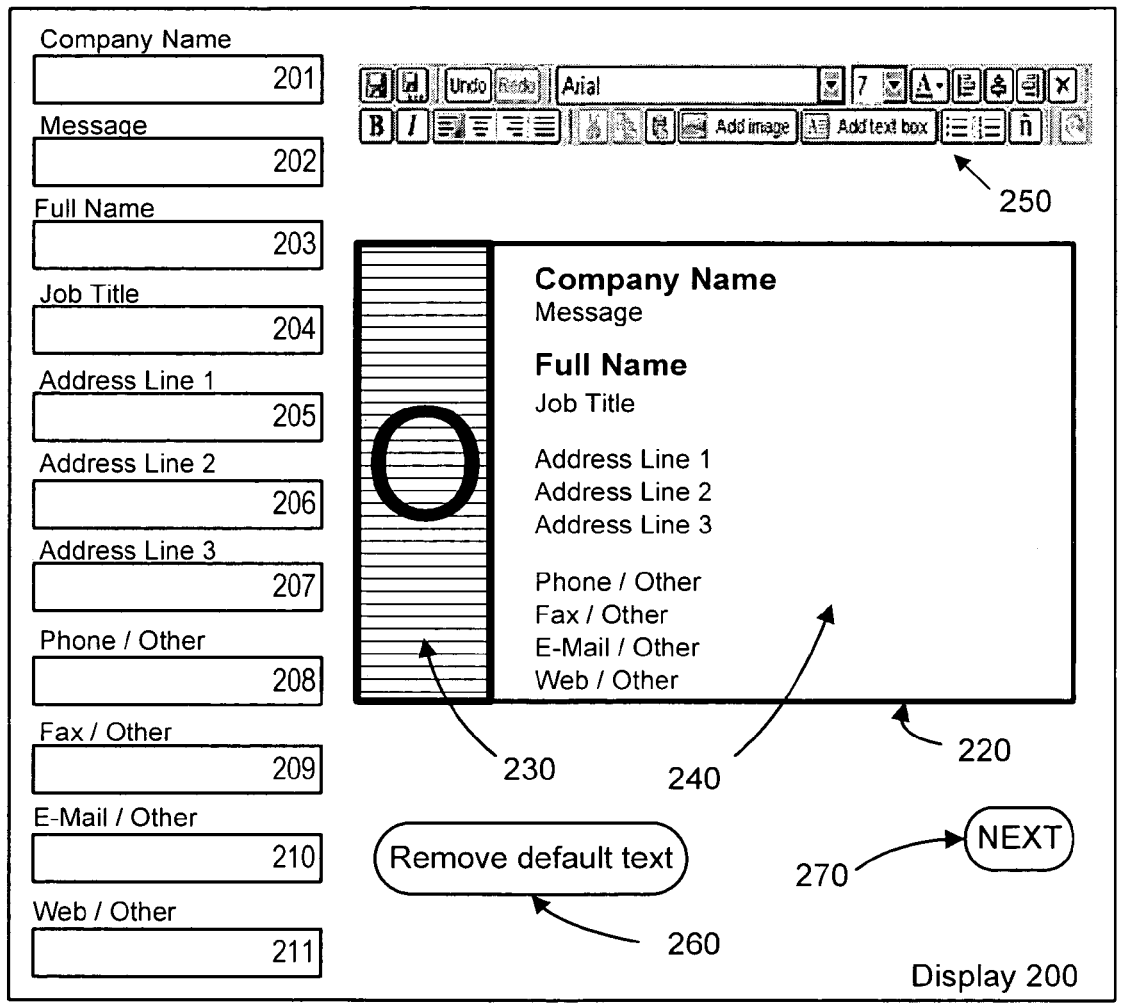
FIGS. 2A-2E depict document customization display screens.

Referring to FIG. 2A, representative online business card creation display 200 is depicted. For the purposes of illustration and discussion, the invention will be described herein in the context of a user who has selected template design 220 and desires to create a custom business card design based on template 220. It will be understood that the invention is not limited to any particular type of product and can be employed in any type of application where there is a requirement or desire to allow a customer to create a customized product design in an online environment. Display 200 may also include various other items, not shown, such as informational, navigational, and promotional banners, messages and links.

In this example of a business card design, text entry fields 201-211 into which the user can enter text are provided. Each text field 201-211 corresponds to a text entry commonly found on business cards. To assist the user in entered the user's personal information, each text entry field 101-111 has an associated text label indicating the type of information suggested for that field. For example, field 201 is indicated as the field for entering the user's company name, field 202 is the field for the user's company message, and so forth. The user is free to enter whatever information is desired in the fields or to leave one or more field empty. When initially displayed to the user, fields 201-211 contain no text. Product customization displays for other types of products would typically provide a different set of text fields with different informational labels corresponding to the type of product being prepared and its anticipated use.

In the template example shown in FIG. 2A, template image 220 has been designed to contain image area 230 and text area 240. The image content of image area 230 is represented generically in FIG. 2A by the oval shape. As will be discussed in more detail below, the displayed image content of image area 230 could be the result of the combination of multiple separate images arranged in an overlying relationship.

To illustrate to the user the location and appearance of the user's information as it would appear in the design, generic default text entries such as "Company Name", "Message", "Full Name" and so forth are initially displayed in template 120 using the default font and font attributes associated with the template by the template designer.

Area 240 could also have an image, color field, design, graphic element, paper effect, or other content acting as a background image and appearing beneath the text. It will be understood that template 220 is merely representative for the purpose of discussion herein.

Each text field in area 240 has an associated font color and associated font properties controlling how text entered in the text field will be rendered, including the name of the font family, font style, font weight, and font size (all collectively referred to herein as "font attributes"), that were selected by the template 220 designer as being complementary to the overall content and style of the template.

To provide a range of additional template 220 editing capabilities to the user, edit tool bar 250 is provided. Edit tool bars, as is known in the art, allow the user to control the appearance of text by selecting a different font family and/or varying other font attributes. As an alternate embodiment, instead of presenting tool bar 250 to all users initially, the printing services provider could implement the template edit display 200 such that a user only gains access to the editing capabilities of tool bar 250 at an extra cost or only upon user request.

Each text field displayed in template 220 is rendered as a separate individual image at server 110 and downloaded to browser 105. The position of each text image within template 220 is maintained by design tools 106 at UCS 100 during the design process. In the disclosed embodiment, the component images in template 220 are created and downloaded from server 110 in one of two image formats depending on whether the image has transparency. Component images with transparency are downloaded in PNG format while images not requiring transparency are downloaded in JPEG format, which generally produces a smaller image file. Server 110 is aware of the format of each component image in template 220 and will automatically download the image in the appropriate format without client request.

While template 120 has been designed to yield a pleasing and functional business card containing eleven common business card data entries, some users may have no need for eleven different entries. A user is not forced to make an entry in each test field 201-211 and may choose to leave one or more fields empty. Alternatively, some users may desire to use more than eleven text fields in the product design. These users may select the "Add text box" button on tool bar 250 to cause an additional text box to be added to the template, initially at a default location such as the upper left corner of template 220. The user can then drag the box to the desired location and enter the appropriate text.

Referring now to FIGS. 2B-2E, representative examples of user text entry and editing will be discussed. For illustrative purposes, the text fields and templates are shown with generic information representing the type of data entries that might be made by a user. All entries entered by a user in text fields 201-211 or entered directly in a text field in template 220 will be generally referred to herein as "text", which will be understood to encompass all characters entered by the user including letters, numbers, punctuation marks, symbols, and the like.

Figure 2B:
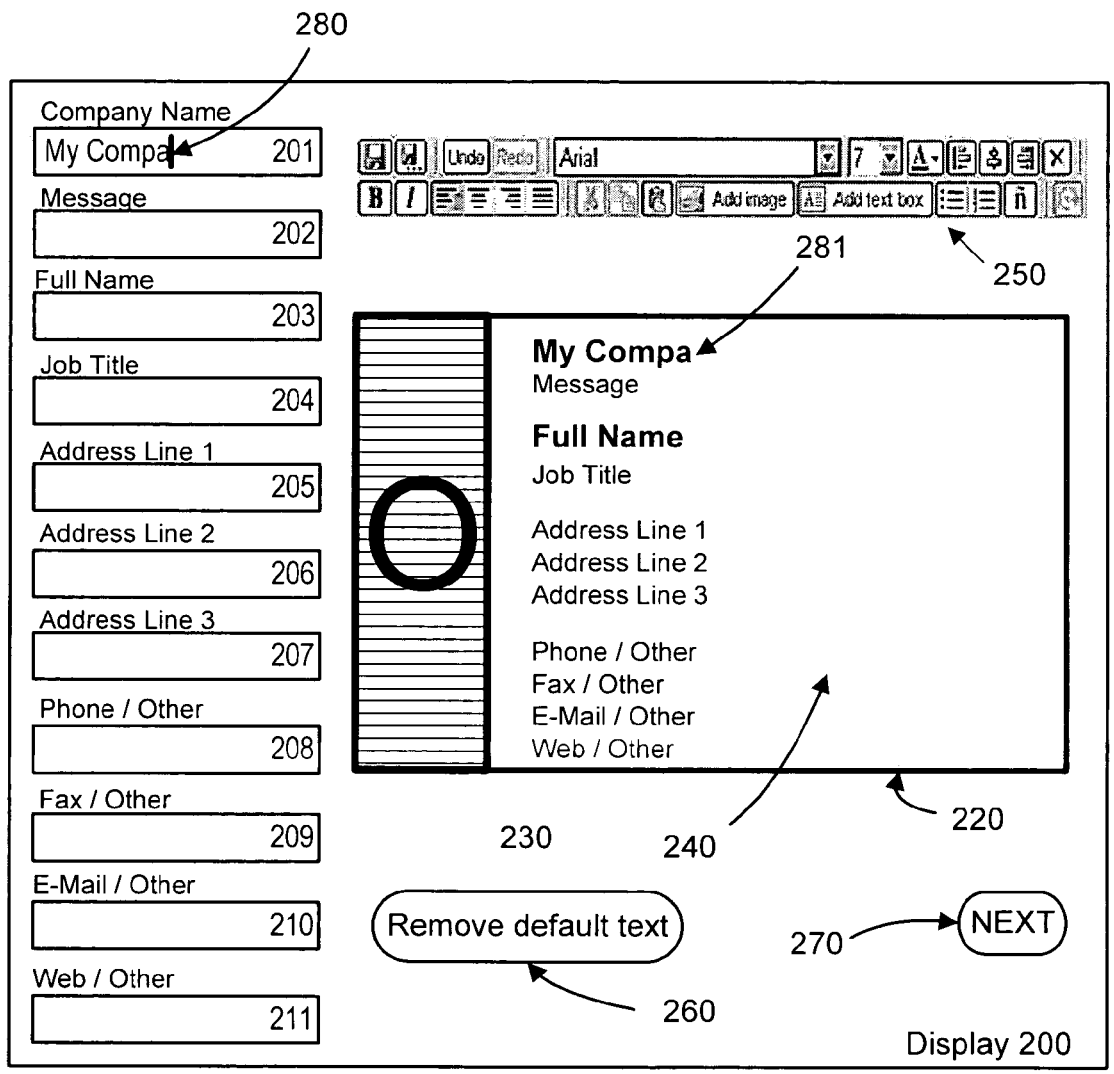

FIG. 2B depicts the status of display 200 after a user has entered a string of characters in field 201. Edit cursor 280 in field 201 indicates the location where the next character will be entered. At this moment, the user has entered "My Compa"and template 220 has been automatically updated, as discussed below, to reflect this user entry. In FIG. 2B, the text "My Compa" 281 displayed in template 220 is an image of the characters in field 201 that was created at server 110 and downloaded to UCS 100. To expedite the generation of the text image at server 110, when the characters entered by the user in field 201 are uploaded to server 110, the necessary information needed at server 110 to render the characters in the appropriate manner is also transmitted as a markup language description of how the text should be rendered. The text is marked up with markup language tags specifying the appropriate font attributes. Structuring the description as marked up text allows the site operator, if desired, to allow the user to specify different font attributes for individual characters or strings of characters within a single text field.

Because all necessary font attribute information is received at the server with the user-entered characters from the text field, the server is not required to make memory calls to retrieve prior state information, thereby minimizing the time required to receive the image back from the server. Whenever a user selects a text field 201-211 to edit and initiates entry of any characters, the default text initially displayed in template 220, such as "Company Name", is removed and replaced with an image of the user-entered characters.

In the disclosed embodiment, a character entry in one of the fields 201-211 does not inherently trigger a transmission to server 110 for a revised text image. Whether one or more than one character entered by a user in the fields 201-211 are uploaded at one time to server 10 for the generation of a new text image depends on the rate at which the user is entering characters into the field. To avoid requiring the server to generate and download many revised images in a very short period of time while text is being entered very rapidly by a fast typist, characters from a text field 201-211 are uploaded to the server only when 350 milliseconds have passed since the last user keystroke. Delay interval periods of more or less than 350 ms could be employed, if desired. Because the file sizes transferred between the user system and the server are relatively small, only a slight delay is experienced between the uploading of the text information to server 110 and the receipt at the user computer of the revised text image.

Rather than use text fields 201-211, some users may desire to approach the customization process by editing text fields directly in template 220. As an alternative to entering text in fields 201-222, the user could individually select and edit the individual text fields in template 220, as will be discussed further below in connection with FIG. 2E.

Figure 2C:
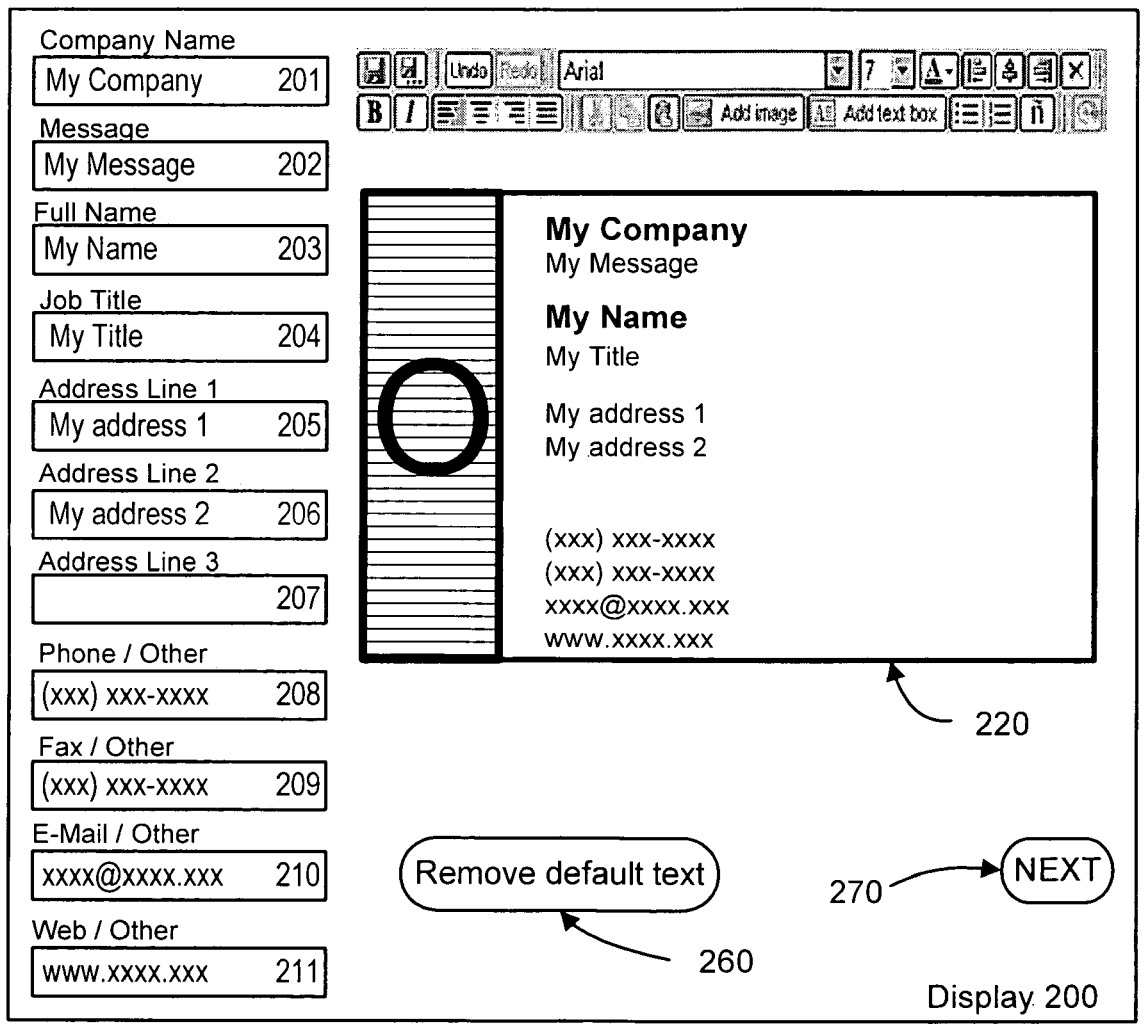

FIG. 2C depicts the status of display 200 after the user has entered text in fields 201-206 and 208-211. Template 220 has been updated with the user-supplied text and the default text "Address Line 3" that appeared in the initial template 220 design has been removed. Default text displayed in template 220 for any unused fields can be removed by the user at any time by the clicking the "remove default text" button 260. Alternatively, the user can accomplish the removal of default text by selecting the unneeded text field 201-211 and then making any keystroke not yielding a displayed character, such as the space bar, the delete key or the backspace key. As another alternative, the user could select the undesired default text field in template 200 and edit the contents of the text field to delete the undesired default text. If a text field contains no visible characters, this situation is recognized and handled by design tools 106 at the client computer. A server-generated image for "empty" text fields is not requested.

As mentioned above, the template designer employed by the site operator selected the initial default font attributes and selected default locations in the template where the text fields would appear, but the user is allowed, if desired, to change any or all of these default elements. To edit the content or position of a text field in the template, the user must first select the desired text box. In the disclosed embodiment, each text box has two states of selection: a first state for the purpose of changing the location and/or size of the text field and a second state for changing the text content and/or font attributes associated with the characters in the text box. To place a text box in the first selected state, the user can position the cursor over the text area in template 220 and click once. To place a text box in the second selected state, the user can position the cursor over the text area of interest and double click.

Figure 2D:
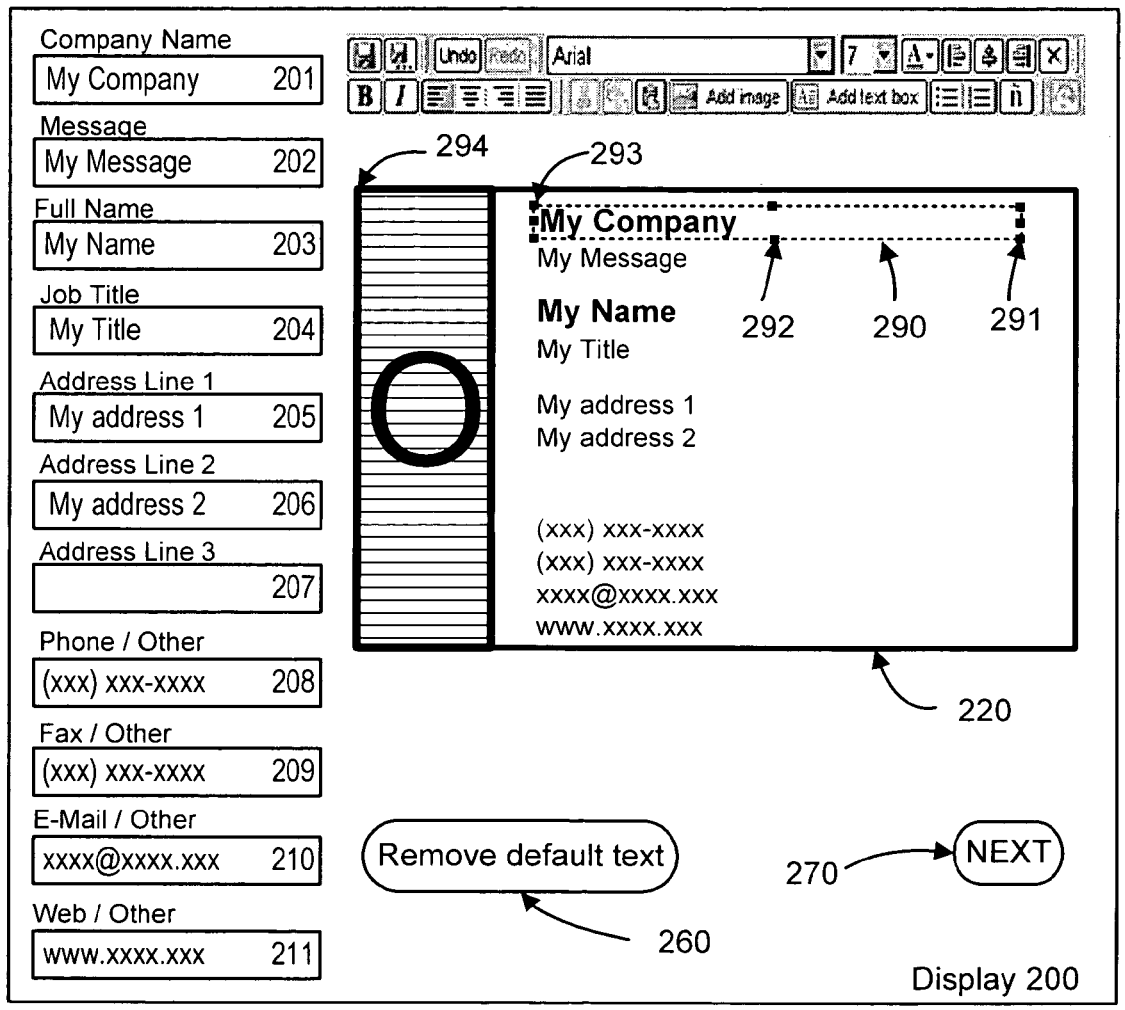

In FIG. 2D, the user has placed text box 290 in the first selected state. In the disclosed embodiment, the first state is visually indicated to the user by the displaying of a dashed line border around the selected text box. When a text box is in this first selected state, the user can reposition the text box using standard click-and-drag techniques or can resize the text box in the standard manner using one of the four corner handles, such as corner handle 291, or one of the four side handles, such as side handle 292.

During the product design process, the current state of the template design is retained by design tools 106 at the user's computer, not at server 110. Design tools 106 maintains the position information for all component images of template 220. In the disclosed embodiment, design tools 106 retains the positional coordinates of the upper left corner of each image, such as corner 293 of text image 290, relative to the upper left corner 294 of the template. Whether or not design tools 106 communicates with server 110 in response to a user action when a text image is in the first selected state depends on the particular user action that was performed.

If the user merely performed a drag and drop operation to move a text image from one position to another position in template 220, the size of the text image does not require revision. In this situation, design tools 106 simply retains the new coordinates of the upper left corner of the text image at its new position in template 220. If, however, the user changed a font attribute, or resized the text image container using one of the side or corner handles, there is a possibility that the displayed appearance of the text may be affected. For example, changing a font attribute may cause the length of the text to change sufficiently to cause the text to become wrapped (or unwrapped) within the text box. Similarly, if the user changes the width of the text box, a string of text that was formerly displayed in the box on a single line might require wrapping onto multiple lines or vice versa. Therefore, each time the user performs such an operation, design tools 106 will forward the width of the text image along with the character and font attribute information to server 110. Based on the received information, server 110 will generate and return a new text image of that text for incorporating into template 220 at the user computer. Because the current state of the template design is retained at the user computer during the design process, server 110 need not retain a copy of text images or be aware of the position of the text images in the template design while the design is being created.

Figure 2E:
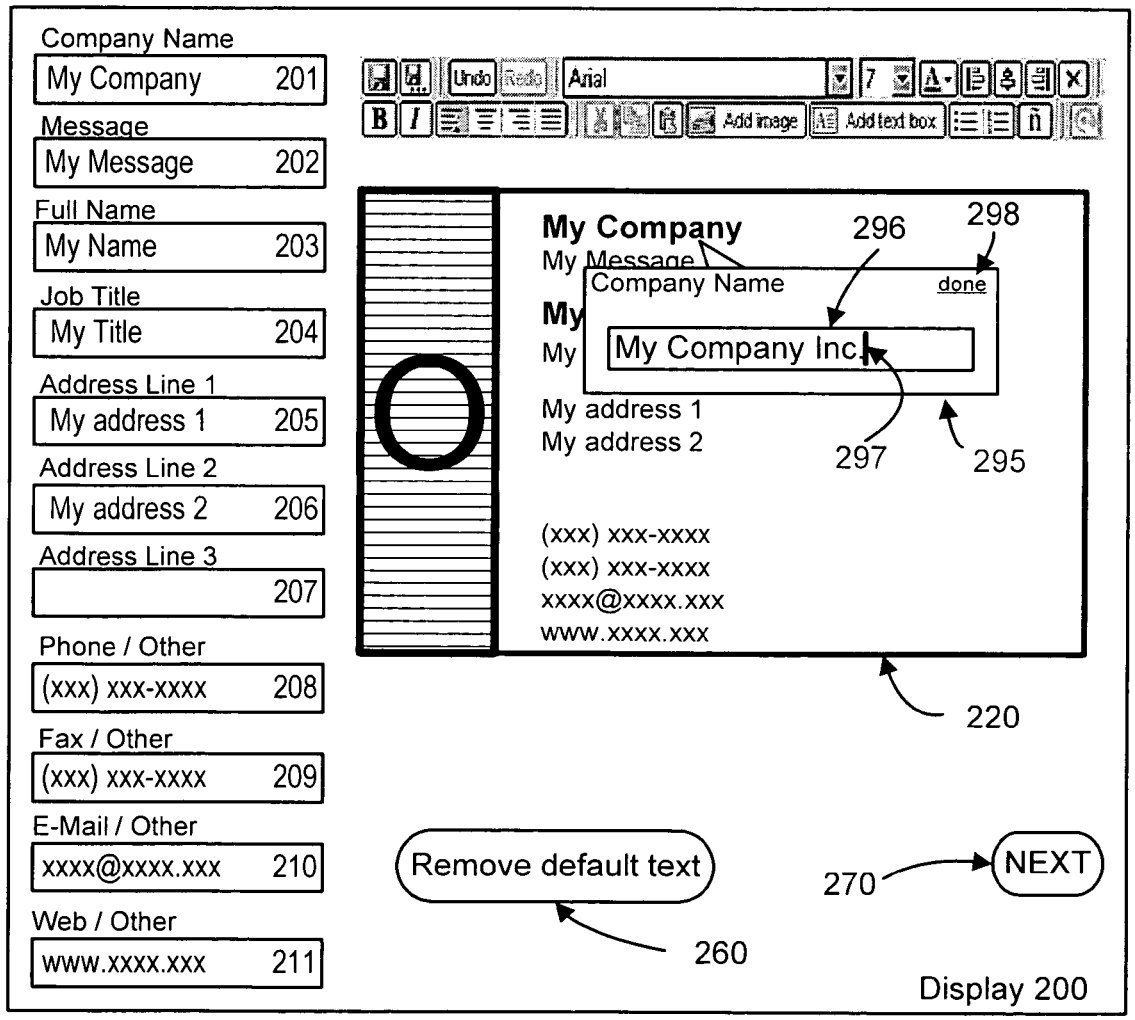

In the situation depicted in FIG. 2E, the user has double clicked on the "My Company" text area in template 220 and placed that text area in a second selected state, indicated to the user by the displaying of text edit window 295 adjacent to the selected text area. Window 295 contains text field 296 wherein the user can enter new text or revise existing text. When window 295 is opened, text field 296 contains the same text as is currently displayed in template 220 in the associated text field. At the moment depicted in FIG. 2E, the user has entered the additional characters "Inc." in text field 297. Cursor 297, positionable by the user, indicates the location with text field 297 where the next character, if any, entered would appear.

As the user is entering or modifying the text in window 295, the user's edits are being sent to server 110 and an updated text image is being automatically received from server 110 and reflected in template 220 using the same process as was discussed above in connection with user edits in fields 201-211 (FIG. 2B). When the user has completed the desired revisions to the text in text field 296, the user can close window 295 by selecting "done" 298. It will be understood that editing of text fields in template 220 could be implemented in other ways, if desired. For example, instead of using window 295, editing could be implemented to appear to the user as if the user is performing inline text editing in template 220. In other words, referring again to FIG. 2D, the user could be allowed to directly edit the text in a textbox, similar to textbox 290, opened in the same position in template 220 as the current text image. This text editing would be at the correct position in template 220, but would be rendered in a system font available at the browser, which in many cases would not be the same font as used to render the text image at the server. When the user has finished with the edits, the server would generate a revised image in the correct font for incorporation into the template and the temporary system font text used for the editing in template 220 will be replaced with the server 110 image.

At any time that the user is satisfied with the design displayed in template 220, the user can select "next" button 270 to cause design tools 106 to transmit the current design, including all user text, text attributes, and text box positions, to server 110 for storage and move on to another step in the process, such as the placing of an order for the production and delivery of a desired quantity of the printed product.

To provide templates that are relevant and attractive to as broad a range of different types of customers and customer interests as possible, the printing services provider will typically design many different templates containing not only a variety of different layouts, colors, and fonts, but also a wide variety of different images. For example, the provider often incorporates one or more photographs or other images of people, places, animals, or objects for the purpose of indicating a particular business occupation or leisure activity, suggesting a concept, or evoking an emotion. This type of image is referred to generally herein as a "content image".

Figure 3:
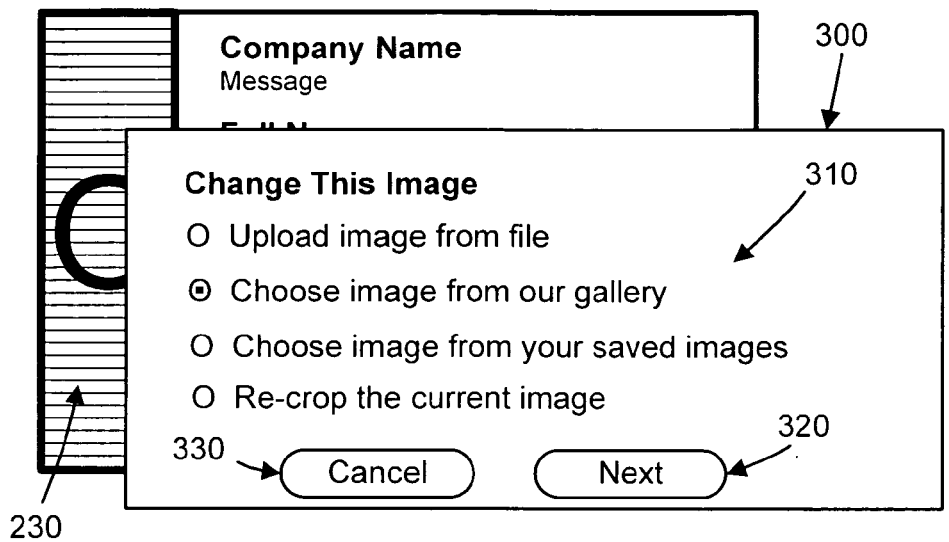
FIG. 3 shows an illustrative image change screen.

In addition to providing tools allowing the customer to enter, edit and position text and to upload, size and position user images as discussed above, the system described herein also provides the user with the ability to modify or replace a component content image in a product design template. Referring to FIG. 3, if the user indicates the user's desire to change a component content image, for example by positioning the cursor over image area 230 and double clicking with the user's mouse, Change This Image window 300 is displayed to the user. In the disclosed embodiment, window 300 presents the user with four options 310 regarding the selected image. These options include (a) re-cropping the content image currently displayed in image area 230, (b) replacing the current content of image area 230 with a different image by uploading a replacement image from a remote file accessible to the user, (c) replacing the current content image with a different image to be selected by the user from a gallery of alternate images maintained by the printing services provider, and (d) replacing the current image with a different image to be selected by the user from images that may have already been uploaded during an earlier design session for another product and saved in connection with the user's account. The user selects a desired option using the radio buttons displayed by each image change option and then selects "Next" button 320 to initiate that operation. If the user decides not to make any change, the user can select "Cancel" button 330 to close window 300. Techniques for uploading and saving images and performing image cropping operations are well known in the art.

In the disclosed embodiment, some aspects of image area 230, such as its size and position within template 220, are fixed features of the layout of the template and not subject to user modification. The service provider could, if desired, implement the layout so as to allow user to also exercise some control over these aspects of image area 230.

While a user may perceive an image area in a template, such as image area 230, as containing a single image, what the user is viewing may actually be the result of the combination of multiple separate images. In the template example depicted herein, the service provider has created a visual effect by placing another image, referred to generally herein as a "masking image", above the content image to alter or enhance the presentation or appeal of the content image. A masking image could be any type of image that totally or partially overlies a content image. For example, a masking image comprised of a geometric vector shape containing a gradient or other fill allowing the underlying content image to be at least partially seen could be employed. Alternatively, one or more geometric elements having some transparent regions and some visible regions could be assembled to create the visual effect that the underlying content image is being presented in a picture frame, viewed through prison bars, seen behind hanging vines, or any number of other visual effects that alter or heighten the style, mood, or appearance of the content image. If the visual effect presented in the template was achieved by the assembly of multiple overlapping shape elements, the server will flatten all of the elements into a single masking image for downloading to the user system. As will be understood by those in the art, the use of geometric vector shapes to create masking images is not essential and other languages, methods or applications capable of generating a Web-compatible image for downloading to the user's computer system could be employed.

To allow a user to initiate a change to the content image, the user must be provided a technique to identify or "select" the content image for editing. Selecting an image is straightforward if the image is readily available by being on top of other image layers that may be present in the template design, but this is not the case where a masking image is positioned above the content image. In this situation, user control over the content image is accomplished through the incorporation of a transparent image, referred to herein as a "surrogate image", which has the same size and position in the template and is maintained in a linked relationship to the content image. The linking of the content image with the surrogate image provides the user with the illusion that the user is directly selecting content image when in reality the user is indirectly accessing the content image through the user's interaction with the surrogate image.

Figure 4:
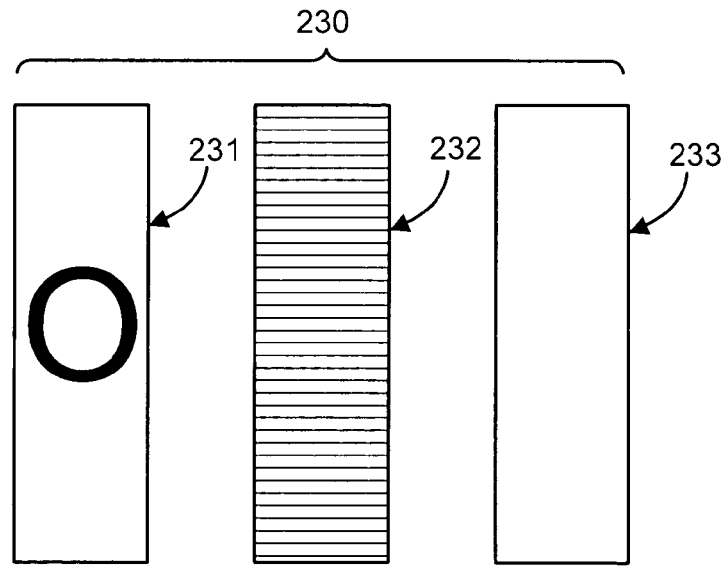
FIGS. 4 and 5 depict component images comprising the displayed content of image area 230.
Figure 5:
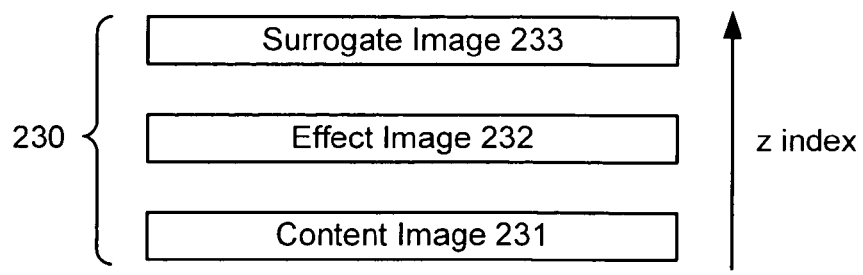

By way of illustration, referring to FIGS. 4 and 5, in the image area 230 example discussed herein, what the user is viewing in image area 230 is the result of displaying transparent surrogate image 233 over masking image 232 which is in turn displayed over content image 231. As discussed above, masking image 232 could contain a wide variety of visible content and is represented in these figures by horizontal lines solely for the purpose of facilitating identification and explanation herein. Also, while masking image 232 is shown in FIG. 4 as being positioned directly above and having the same size as content image 231, this will not always be the case for all masking images in all templates, therefore the masking image is not directly suitable for use as a proxy for the content image.

Positioning surrogate image 233 as the top image in this image group provides the user with the illusion that the user is directly selecting and interacting with content image 231. If the user double clicks over image area 230, the user is actually selecting surrogate image 233, but the action is recognized and interpreted by design tools 106 as a desire by the user to select underlying content image 231.

Figure 6:
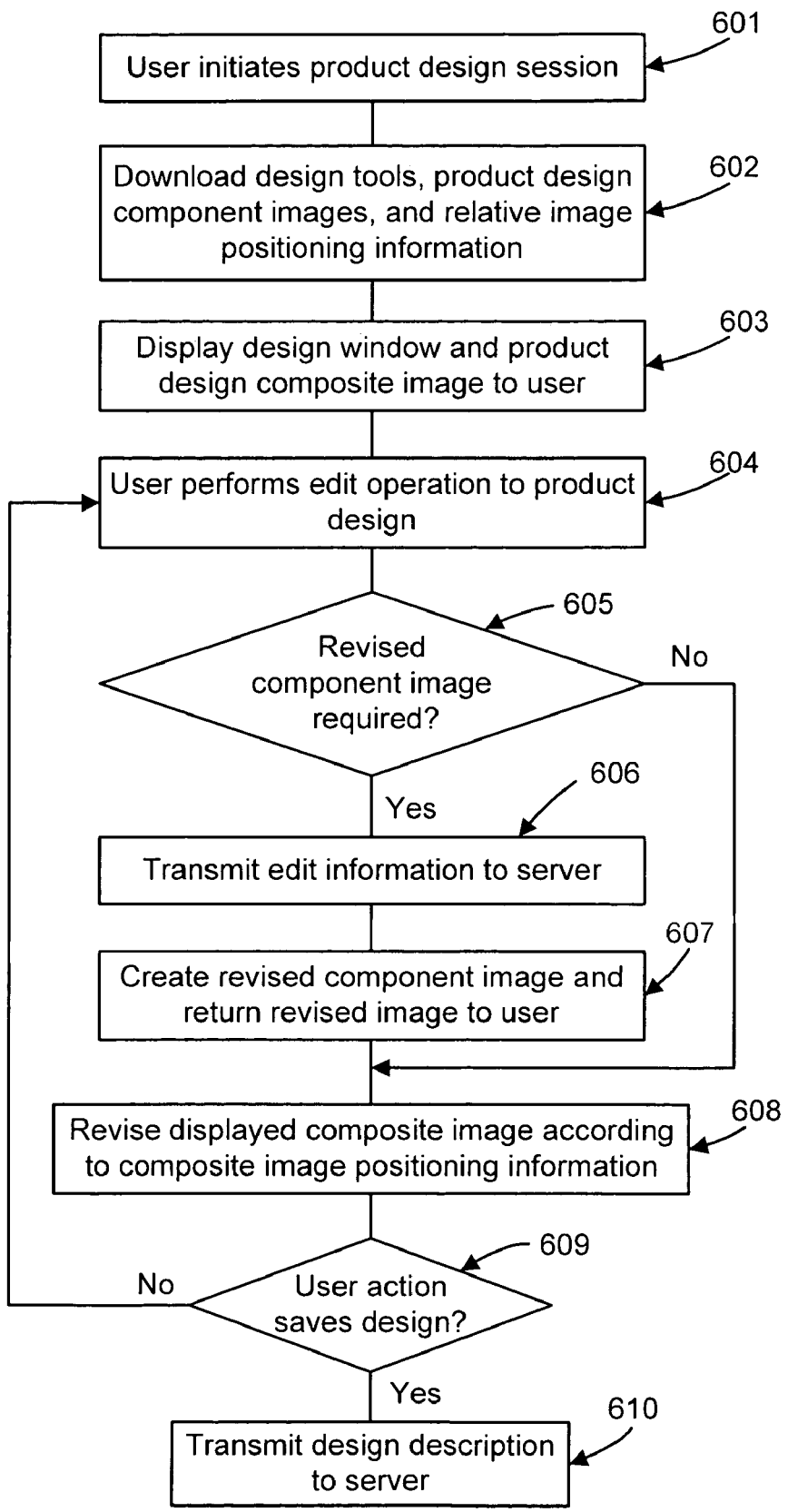
FIG. 6 shows a flow chart of one method for employing the invention.

Looking at FIG. 6, one embodiment of a method for creating an electronic product design employing multiple separate component images will now be discussed. At step 601, a user initiates a product design session at a printing service provider web site, for example by selecting one of the available pre-designed templates for customization. At step 602, server 110 downloads design tools 106, including customization display 200 and the component images that combine to yield the initial image of template 220, to the user's computer. At step 603, display 200 and the initial default design of template 220 are displayed to the user at the user's computer.

At step 604, the user performs an edit operation that will have the effect of altering the appearance of template 220. As discussed above in connection with FIGS. 2A-2E, some edit operations will require uploading information to server 110 for the generation of a revised component image and some will not. At step 605, if the edit operation is the type of operation that will or may alter the appearance of the content of a component image, such as entering text in text fields 201-211, resizing the text container, or editing the text content of an image, the relevant edit information will be transmitted to server 110 at step 606 for generation of a revised image.

When a revised text image is required from server 110, the text characters, the identifiers of the font and font attributes for the text, and the size of the text box containing the text are supplied to server 110 to allow the server to generate and return the image of the text as quickly as possible. Server 110 will create and return a revised image at step 607. Based on the image position coordinates for the component image maintained at the user computer by design tools 106, the revised image received from server 110 will be incorporated into template 220 at the appropriate position.

If the user operation at step 604 does not require the creation of a revised component image at step 605, for example if the user operation was only to click and drag an existing component image to another location without changing the size or content of the image, the template 220 image is updated at step 608 by design tools 106 based on the new image position information with no server involvement.

At step 609, the user can continue with customizing the template by performing another edit operation or can conclude the design session and move on to another step in the ordering process. As discussed above, while a user is editing the individual component text fields in the template 220 design, the template image will be frequently and incrementally updated with revised versions of individual component images to continuously present the user with the most current version of the product design in progress. Steps 604-608 will, therefore, typically be repeated many times during the course of a product design session.

When the user has completed the custom product design and desires to terminate the design session, the user can save the current template design by clicking "next" button 270. In response to next 270, design tools 106 will forward the design description information to server 110 for retention and eventual production of the product by printing or other production process. The design description will include the final position, size, and content information for each component text image in the template design, allowing the template design to be subsequently generated at server 110 for printing or other processing.

While the invention has been shown and described in various exemplary embodiments, the described embodiment is to be considered as illustrative rather than restrictive. For example, the template design being customized could be for a product to be printed on paper or on any other printable medium such as cloth, glass, plastic, rubber, or wood. The design could be for a complete product, or intended to be incorporated into a larger product, such as a section, side, or page. The scope of the invention is as indicated in the following claims and all equivalent methods and apparatus.

What is claimed is:

1. A computer-implemented method of creating a custom product design at a user computer executing a browser program, the method comprising receiving from a server one or more product design tools executable in the browser at the user computer, receiving from the server a product design template and information identifying the size and position in the template of one or more individual image containers for containing respective content images, detecting selection by a user of at least one of the one or more image containers, detecting modification by a user of the size of a selected image container or of content or associated content attributes of the selected image container, automatically, and without user request, transmitting only modified container information to the server, the modified container information comprising image container size information, content information and content attribute information associated with the selected image container, the modified container information including any of said detected modifications to said image container size or content or content attributes, receiving from the server a content image rendered by the server based on the modified container information, positioning the received content image in its corresponding selected image container in the product design; wherein the image container position is retained only at the user computer, and displaying the revised template image to the user.

2. The method of claim 1 wherein the transmission to the server of the modified container information occurs after a predetermined period of time has passed since a most recent user modification of the size of a selected image container or content or associated content attributes of the selected image container has been detected.

3. The method of claim 1 further comprising allowing the user to modify the location of the selected image container and, in response to the user location modifications, revising at the user computer and without interaction with the server, the displayed product design by positioning the selected image container and any image contained therein at the new location indicated by the user, wherein prior to receiving an indication that the user desires to save the product design, the new location of the selected image container and any image contained therein is retained only at the user computer and not at the server.

4. The method of claim 1 further comprising, in response to an indication that the user desires to save the product design, sending to the server the description of the product design including, for each image container in the product design, at least the size, position, content, and content attributes in the product design.

5. The method of claim 1 further comprising receiving from the user an order for the production and delivery of a quantity of the product design in physical form.

6. One or more computer readable media have encoded thereon computer executable instructions for performing the method of claim 1.

7. A computer-implemented method of creating a custom product design, the method comprising downloading, by a server to a user computer, one or more product design tools executable in the browser at the user computer, downloading, by the server to the user computer, a product design template and information identifying the size and position in the template of one or more individual image containers for containing respective content images, receiving, by the server from the user computer, only modified container information transmitted automatically and without user request from the user computer, the modified container information associated with a user-selected image container that has been modified by the user in terms of at least one of image container size, content, or content attributes, the modified container information comprising image container size information, content information, and content attribute information, the modified container information including the modifications made by the user, rendering, by the server, an image based on the received modified container information, transmitting the rendered image to the user computer for placement in the user-selected image container in the design template in accordance with image container positioning information retained only at the user computer.

8. The method of claim 7 further comprising, after the user has indicated a desire to save the product design, receiving from the user computer the description of the product design including, for each image container in the product design, at least the size, position, content, and content attributes in the product design.

9. The method of claim 7 further comprising allowing the user to place an order for the production and delivery of a quantity of the product design in physical form.

10. One or more computer readable media have encoded thereon computer executable instructions for performing the method of claim 7.

11. The method of claim 1, wherein the selected image container corresponds to a respective user input text field for receiving text input by a user, the respective user input text field having associated font attribute information, and the selected image container is configured to contain a text image comprising an image of text input in the respective user input text field rendered based on the font attribute information and image container size.

12. The method of claim 11, wherein:

said detecting step comprises detecting text input by a user to the respective user input text field, the text input comprising new text or revisions to current text in the user input text field, and said transmitting step comprises transmitting to the server at least the new text or revisions to current text in the user input text field and corresponding font attributes and the size of the selected image container for rendering into a text image to be inserted into the selected image container.

13. The method of claim 11, wherein:

said detecting step comprises detecting modification of the font attribute information associated with a user input text field by a user, and said transmitting step comprises transmitting to the server at least the current text in the user input text field and corresponding modified font attributes and the size of the corresponding selected image container for rendering into a text image to be inserted into the selected image container.

14. The method of claim 11, wherein:

said detecting step comprises detecting user modification of the size of the selected image container, and said transmitting step comprises transmitting to the server at least the current text in the user input text field and corresponding font attributes and the modified size of the selected image container for rendering into a text image to be inserted into the selected image container.

15. The method of claim 1, wherein the transmitted image container size information comprises at least the width of the selected image container.

16. The method of claim 1, further comprising:

a text container associated with the selected image container and positioned in a same position in the template as the selected image container, the text container selectable by the user to enter or revise text content, wherein upon detection of selection of the text container by the user and further detection of entry or revision of text in the text container, automatically, and without user request, transmitting to the server at least the entered or revised text and corresponding font attributes and the size of the selected image container for rendering into a text image to be inserted into the selected image container.

17. The method of claim 1, wherein the server does not retain the state of the current product design while the design is being created in the browser program.

18. The method of claim 1, wherein the selected image container comprises an image contained therein which may be modified by the user.

19. The method of claim 18, wherein the one or more product design tools are configured to provide one or more image replacement tools to allow the user to replace the image contained in the selected image container with a replacement content image.

20. The method of claim 19, wherein the one or more image replacement tools is configured to allow the user to select the replacement content image from a set of content images maintained at the server.

21. The method of claim 20, wherein at least one of the set of content images maintained at the server was uploaded to the server by the user.

22. The method of claim 19, wherein the one or more image replacement tools is configured to allow the user to upload an image to the server, the server configured to render the uploaded image as a replacement content image and to download the replacement content image to the one or more design tools for insertion into the selected image container.

23. The method of claim 19, the one or more product design tools providing one or more image cropping tools configured to allow the user to crop an image contained in the selected image container.

24. An apparatus, comprising:
one or more processors configured to execute the method of claim 1.

25. An apparatus, comprising:
one or more processors configured to execute the method of claim 7.

* * * * *